(12) United States Patent
Ishikura et al.

(10) Patent No.: US 11,736,636 B2
(45) Date of Patent: Aug. 22, 2023

(54) IMAGE READING DEVICE WITH DISPLAY DISPOSED BETWEEN CAMERA AND PLACEMENT SECTION

(71) Applicant: FUJIFILM Business Innovation Corp., Tokyo (JP)

(72) Inventors: Kenichi Ishikura, Kanagawa (JP); Takuya Ishikawa, Kanagawa (JP); Kei Otagiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/553,604

(22) Filed: Dec. 16, 2021

(65) Prior Publication Data

US 2023/0053499 A1 Feb. 23, 2023

(30) Foreign Application Priority Data

Aug. 23, 2021 (JP) ................................. 2021-135516

(51) Int. Cl.
*H04N 1/00* (2006.01)
*H04N 1/195* (2006.01)
*H04N 1/028* (2006.01)

(52) U.S. Cl.
CPC ..... *H04N 1/00557* (2013.01); *H04N 1/00493* (2013.01); *H04N 1/00997* (2013.01); *H04N 1/02815* (2013.01); *H04N 1/19594* (2013.01); *H04N 1/00559* (2013.01)

(58) Field of Classification Search
CPC ........... H04N 1/00557; H04N 1/00493; H04N 1/00997; H04N 1/02815; H04N 1/00559; H04N 1/00564; H04N 1/00519
See application file for complete search history.

(56) References Cited

U.S. PATENT DOCUMENTS

| 9,270,933 | B1* | 2/2016 | Jiang | H04N 23/61 |
|---|---|---|---|---|
| 2013/0335789 | A1* | 12/2013 | Kimura | H04N 1/193 |
| | | | | 358/475 |
| 2017/0069228 | A1* | 3/2017 | Reznik | G06T 11/60 |
| 2019/0147728 | A1* | 5/2019 | Tamura | G06T 7/521 |
| | | | | 348/135 |
| 2020/0286220 | A1* | 9/2020 | Ogawa | G06T 7/521 |
| 2021/0120137 | A1 | 4/2021 | Okamoto et al. | |
| 2021/0382575 | A1* | 12/2021 | Kitazawa | G06T 7/70 |
| 2022/0058384 | A1* | 2/2022 | Albines | G07G 1/0036 |
| 2022/0066300 | A1* | 3/2022 | Park | G03B 17/54 |
| 2022/0232138 | A1* | 7/2022 | Gao | H04N 1/02815 |

FOREIGN PATENT DOCUMENTS

JP 2021068980 4/2021

* cited by examiner

*Primary Examiner* — Benjamin O Dulaney
(74) *Attorney, Agent, or Firm* — JCIPRNET

(57) ABSTRACT

An image reading device includes a placement section on which a subject is placed, an image capturing unit that is disposed above the placement section and captures an image of the subject, an irradiating unit that is disposed above the placement section and irradiates the subject with light, and a display unit that is disposed between the placement section and the image capturing unit and between the placement section and the irradiating unit, the display unit being located at a position outside an image capturing range of the image capturing unit and an irradiation range of the irradiating unit.

20 Claims, 6 Drawing Sheets

IMAGE READING DEVICE WITH DISPLAY DISPOSED BETWEEN CAMERA AND PLACEMENT SECTION

CROSS-REFERENCE TO RELATED APPLICATIONS

This application is based on and claims priority under 35 USC 119 from Japanese Patent Application No. 2021-135516 filed Aug. 23, 2021.

BACKGROUND

(i) Technical Field

The present disclosure relates to image reading devices.

(ii) Related Art

Japanese Unexamined Patent Application Publication No. 2021-068980 discloses an example of a known document reading device in the related art that includes a document placement base having a document reader and that also includes an automatic document feeder supported by the document placement base in a rotatable manner between a closed position in which the automatic document feeder covers the upper surface of the document placement base and an open position in which the automatic document feeder exposes the upper surface of the document placement base.

SUMMARY

Aspects of non-limiting embodiments of the present disclosure relate to an image reading device that has an image capturing unit configured to capture an image of a placed subject from above the subject and that is capable of reading the image of the subject captured by the image capturing unit even if a display unit exists between a placement section on which the subject is placed and the image capturing unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading device including a placement section on which a subject is placed, an image capturing unit that is disposed above the placement section and captures an image of the subject, an irradiating unit that is disposed above the placement section and irradiates the subject with light, and a display unit that is disposed between the placement section and the image capturing unit and between the placement section and the irradiating unit, the display unit being located at a position outside an image capturing range of the image capturing unit and an irradiation range of the irradiating unit.

BRIEF DESCRIPTION OF THE DRAWINGS

An exemplary embodiment of the present disclosure will be described in detail based on the following figures, wherein.

DETAILED DESCRIPTION

Figure 1:
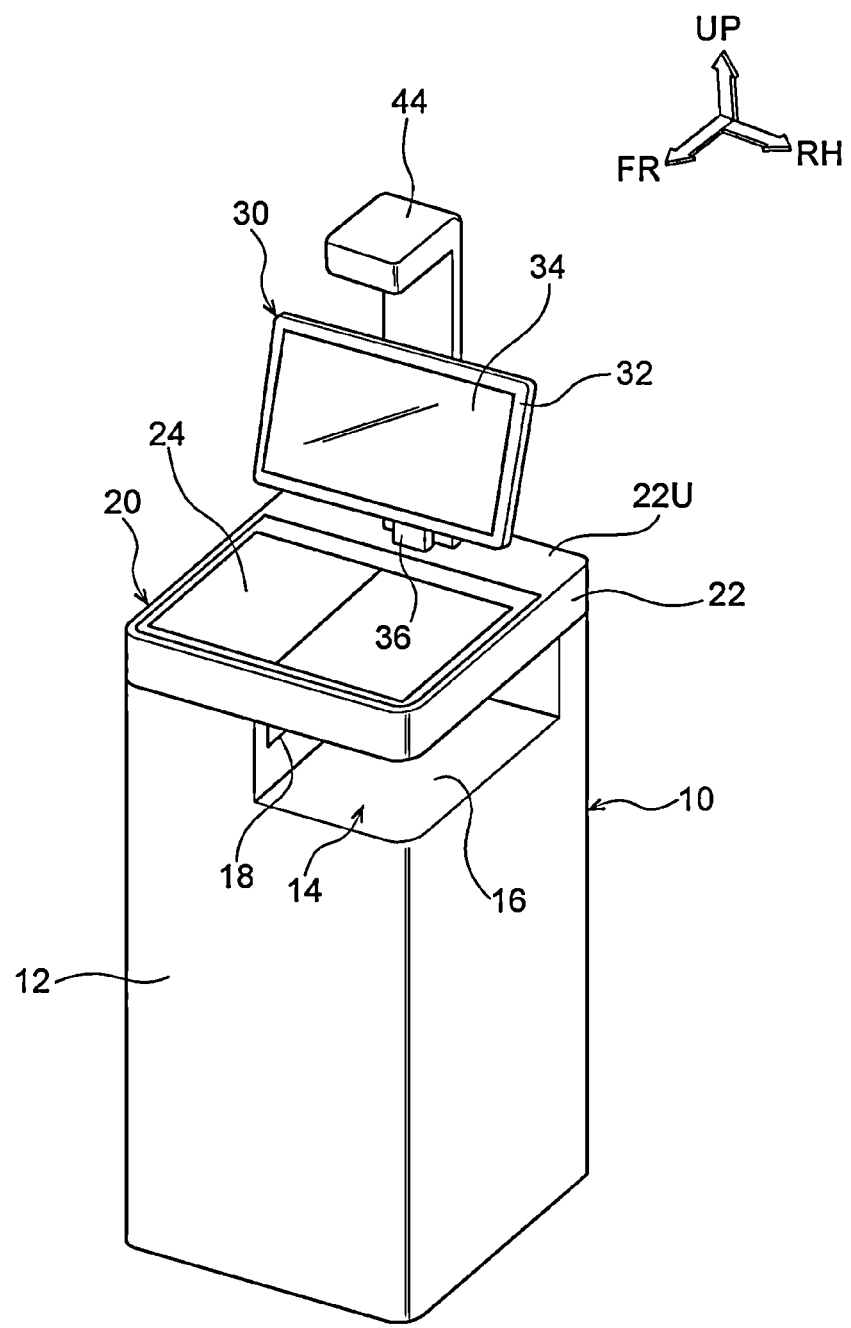
FIG. 1 is a perspective view illustrating an image forming apparatus equipped with an image reading device according to this exemplary embodiment.

An exemplary embodiment of the present disclosure will be described in detail below with reference to the drawings. For the sake of convenience, an arrow UP indicated in FIG. 1 is defined as the upper side or upward direction of an image reading device 20, and an arrow RH is defined as the right side or rightward direction of the image reading device 20. Therefore, the terms "up-down direction" and "left-right direction" used in the following description without being specified refer to the up-down direction and the left-right direction of the image reading device 20, respectively. Furthermore, the left-right direction is synonymous with the width direction of the image reading device 20.

Furthermore, for the sake of convenience, an arrow FR indicated in FIG. 1 is defined as the front side or forward direction of the image reading device 20, and the side or direction opposite the arrow FR is defined as the rear side or rearward direction of the image reading device 20. It is assumed that an operator stands at the front side of the image reading device 20. In other words, the standing position of the operator is located at the front side of the image reading device 20. A view from the standing position of the operator is defined as a front view. The arrow FR may sometimes be referred to as the forward direction of the image reading device 20, and the direction opposite the arrow FR may sometimes be referred to as the rearward direction of the image reading device 20.

As shown in FIG. 1, an image forming apparatus 10 equipped with the image reading device 20 according to this exemplary embodiment includes an apparatus body 12 having a shape of a rectangular housing. The apparatus body 12 contains an accommodation section (not shown) that accommodates recording paper (not shown) as an example of a recording medium, a transport unit (not shown) that transports the recording paper, an image forming unit (not shown) that forms an image onto the transported recording paper, and a fixing unit (not shown) that fixes the image onto the recording paper.

A cutout-like step 14 is provided at the right side of the upper end of the apparatus body 12, and the base surface of the step 14 serves as an output section 16. A rightward-facing sidewall in the step 14 is provided with an outlet 18 from which the recording paper having the image fixed thereon is output, and the recording paper output from the outlet 18 is placed on the output section 16.

The image reading device 20 is provided at the upper side of the apparatus body 12. The image reading device 20 includes a device body 22 having a shape of a rectangular housing with a length in the front-rear direction and a length in the left-right direction that are substantially equal to those of the apparatus body 12. A part of a top surface 22U of the device body 22 serves as a placement section 24 on which a document (not shown) as an example of a subject is to be placed. The placement section 24 may have an uneven surface.

Figure 2:
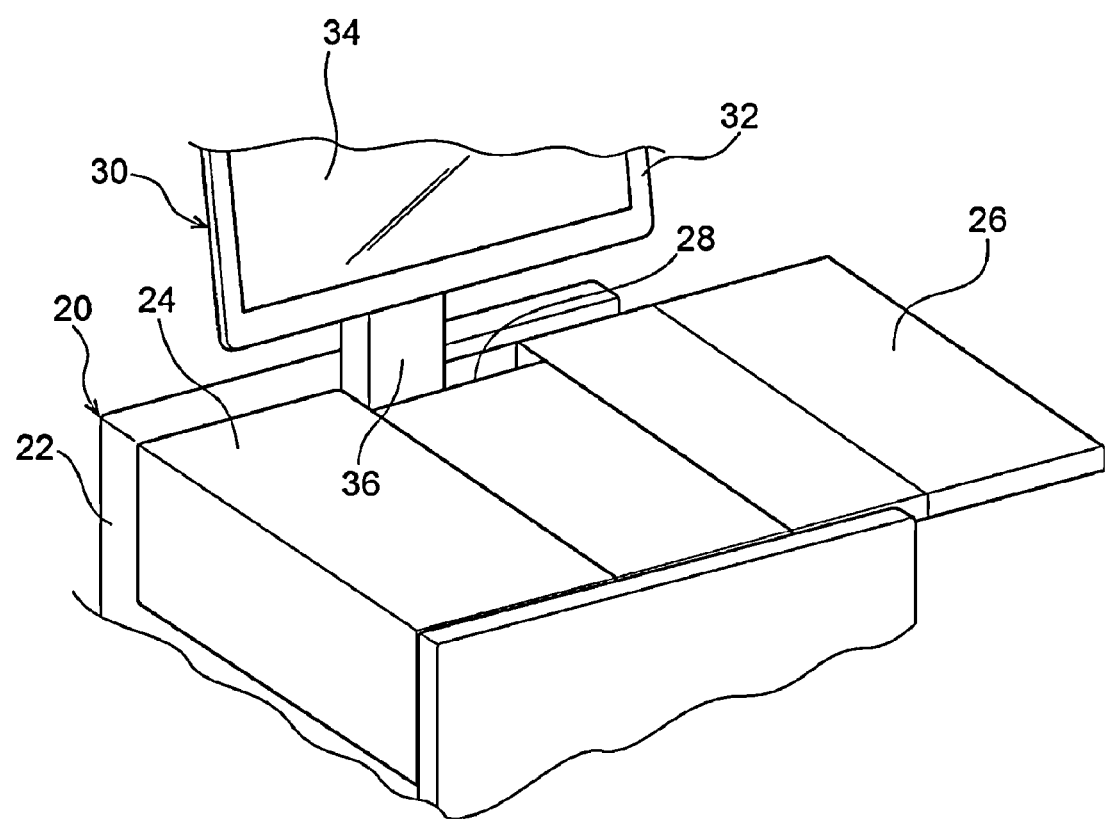
FIG. 2 is a perspective view illustrating the image reading device according to this exemplary embodiment.

As shown in FIG. 2, the right side of the placement section 24 is ejectable rightward, and the ejected part of the placement section 24 serves as a part of a document placement section 26 on which the document is placed when the document is to be read while being transported. Thus, the device body 22 of the image reading device 20 contains a transport unit (not shown) that transports the document and a reading unit (not shown) that reads an image from the document.

Figure 3:
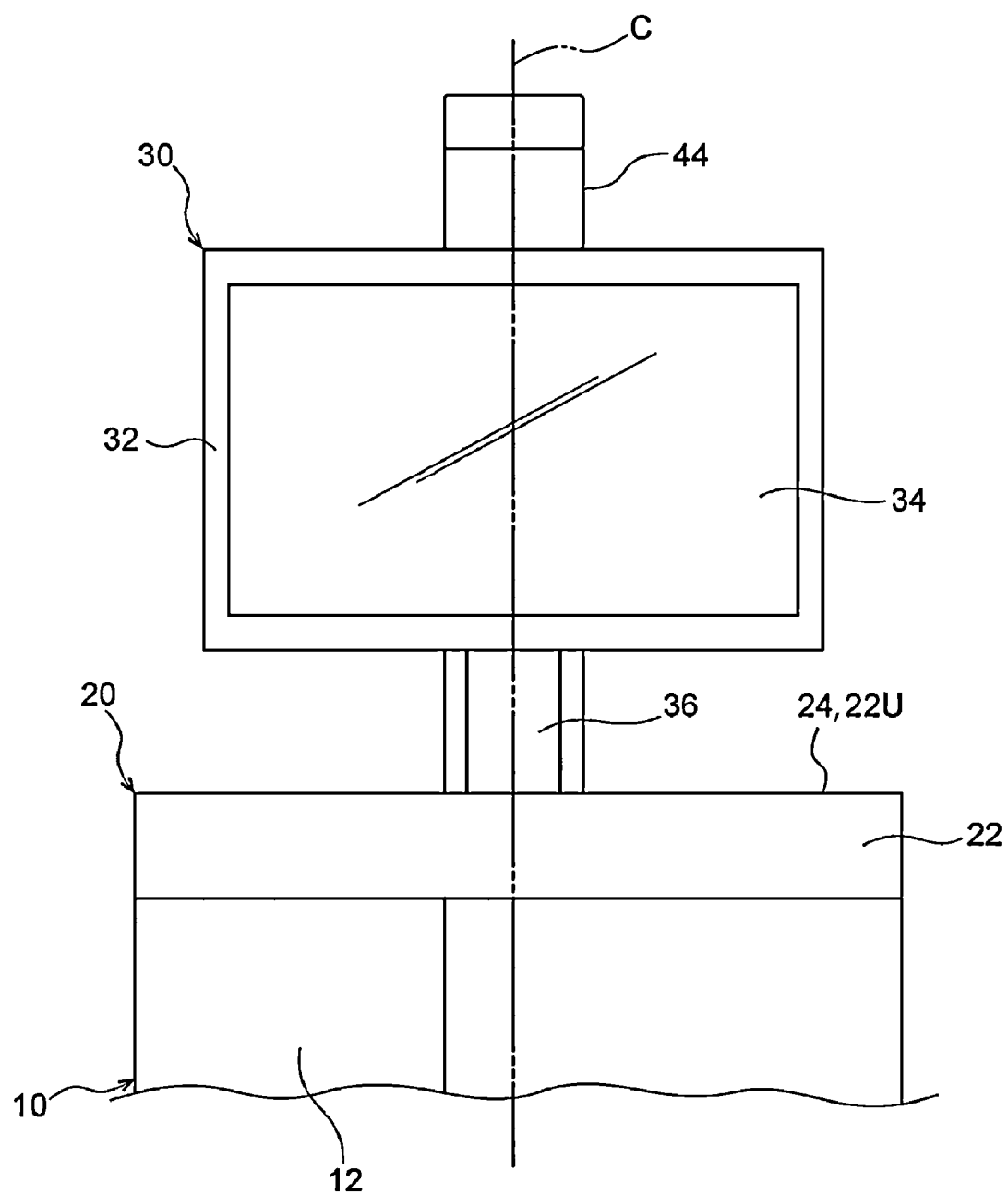
FIG. 3 is a front view illustrating the image reading device according to this exemplary embodiment.
Figure 4:
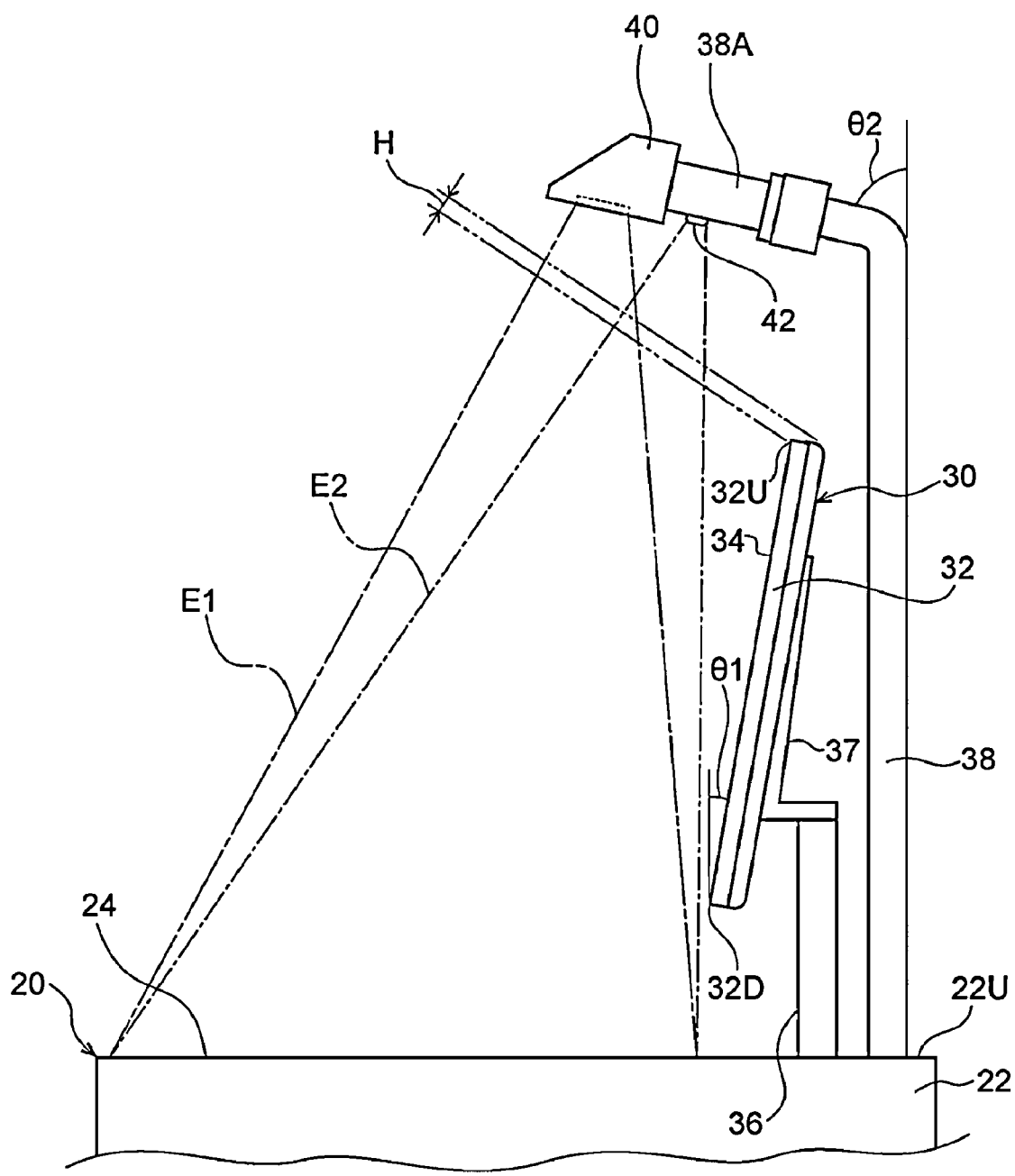
FIG. 4 is a side view illustrating the image reading device according to this exemplary embodiment.

As shown in FIGS. 1 to 4, a display unit 30 that is rectangular in front view and extends longitudinally in the left-right direction is disposed at the rear side of the device body 22 and above the placement section 24. More specifically, as shown in FIG. 4, a quadrangular pillar 36 extends upward from the center, in the left-right direction, at the rear side of the upper surface of the apparatus body 12. The center, in the left-right direction, of the rear surface of the display unit 30 is fixed to a support member 37 integrated with the upper end of the pillar 36.

In other words, the display unit 30 is supported by the pillar 36 with the support member 37 interposed therebetween and is fixed in a rearward-tilted state at a predetermined angle θ1 relative to the vertical direction to facilitate a touching operation on an operable section 34, to be described later, for the operator. As shown in FIG. 2, the rear edge of the top surface 22U of the device body 22 is provided with a cutout 28 as an example of an accommodation section capable of accommodating the pillar 36. The cutout 28 is substantially rectangular in plan view, extends longitudinally in the left-right direction, and is large enough to allow the pillar 36 to extend therethrough.

As shown in FIGS. 1 to 3, the display unit 30 has a rectangular frame body 32, and a screen surrounded by the frame body 32 serves as the operable section 34 operable by the operator. In other words, the display unit 30 has the operable section 34 constituted of a so-called touchscreen, and the operator is capable of performing an input operation by touching an item displayed on the screen of the operable section 34 with a finger. The operable section 34 in the display unit 30 has a size of, for example, 15 inches and is thus a heavy object. Therefore, the operable section 34 is supported by the apparatus body 12 of the image forming apparatus 10 by using the pillar 36.

As shown in FIG. 4, a support pillar 38 extending higher than the pillar 36 is provided at the rear side of the pillar 36 in the device body 22 of the image reading device 20. The support pillar 38 extends upward independently of the pillar 36 at the same widthwise position as the pillar 36, that is, at aligned positions in front view, as shown in FIG. 3. In other words, the support pillar 38 extends upward in a state where, for example, there is no connection member provided between the support pillar 38 and the pillar 36.

A document camera 40 as an example of an image capturing unit that captures an image of the document placed on the placement section 24 is provided at the upper end of the support pillar 38 located above the display unit 30. More specifically, in side view from the width direction, the upper end of the support pillar 38 is bent forward at a predetermined angle θ2 relative to the vertical direction to serve as a bent section 38A, and the document camera 40 is integrally attached to the distal end of the bent section 38A. For example, the angle θ2 desirably ranges between 75° and 80°.

The document camera 40 is capable of exchanging data with an image processor (not shown) provided inside the apparatus body 12 of the image forming apparatus 10. Image data captured and acquired by the document camera 40 is storable in and outputtable from the image processor. The image processor is capable of exchanging data with the reading unit provided inside the device body 22 of the image reading device 20. When an image is to be captured by the document camera 40, the operable section 34 of the display unit 30 is set to a dark mode to prevent light leaking from the operable section 34 of the display unit 30 from being radiated onto the placement section 24.

Furthermore, as shown in FIG. 4, the bent section 38A located higher than the display unit 30 and lower than the document camera 40 is provided with a light-emitting-diode (LED) lamp 42 as an example of an irradiating unit that irradiates the document placed on the placement section 24 with light. In other words, the document camera 40 and the LED lamp 42 are supported by the device body 22 of the image reading device 20 by using the support pillar 38, and are disposed higher than the display unit 30.

In plan view, the document camera 40 and the LED lamp 42 are fixed to positions where they overhang toward the placement section 24 beyond the display unit 30. The LED lamp 42 includes a light source (not shown) and a projector lens (not shown). In FIGS. 1 and 3, only a cover 44 that covers the support pillar 38, a part of the document camera 40, and a part of the LED lamp 42 is shown. In FIG. 2, the cover 44 is not shown.

As shown in FIG. 3, in front view from the standing position of the operator, the display unit 30, the document camera 40, and the LED lamp 42 are arranged in the up-down direction. Specifically, in front view, the center of the display unit 30 in the left-right direction, the center of the LED lamp 42 in the left-right direction, and the center of the document camera 40 in the left-right direction are arranged on an imaginary center line C as an example of a straight line extending from bottom up in the up-down direction.

The center of the document camera 40 may be regarded as an optical axis of a lens (not shown) in the document camera 40, and the center of the LED lamp 42 may be regarded as an optical axis of the projector lens in the LED lamp 42. The center of the display unit 30 may be regarded as an intersection point between an imaginary center line of the display unit 30 in the left-right direction and an imaginary center line thereof in the up-down direction. The imaginary center line of the display unit 30 in the left-right direction is the same as the imaginary center line C shown in FIG. 3.

As shown in FIG. 4, the display unit 30 is disposed at a position located outside an image capturing range E1 of the document camera 40 and an irradiation range E2 of the LED lamp 42. Specifically, the image capturing range E1 of the document camera 40 is disposed forward of, that is, at the front side of, a lower end 32D of the frame body 32 of the display unit 30. Likewise, the irradiation range E2 of the LED lamp 42 is disposed forward of, that is, at the front side of, the lower end 32D of the frame body 32 of the display unit 30.

The image capturing range E1 will now be described. Although the document camera 40 is desirably disposed at a position as low as possible, it is desirable that the image capturing range E1 of the document camera 40 be disposed toward the front side and at an angle to prevent the document camera 40 from overlapping the display unit 30 in a situation where the document camera 40 is disposed toward the rear side. Thus, as shown in FIG. 5 in which the left side is the front side, the image capturing range E1 is a range indicated with an imaginary line K1, thus resulting in a distorted captured image.

Furthermore, although the document camera 40 is desirably disposed toward the front side as much as possible, if the document camera 40 overhangs too much toward the front side, the document camera 40 may disturbingly get in the way of the field of view of the operator when operating the operable section 34 of the display unit 30. For example, as shown in FIG. 4, when measurement is performed with the line of sight of an operator whose height is 185 cm or more, there is a high possibility that the document camera 40 may disturbingly get in the way of the field of view of the operator unless the document camera 40 is disposed at a position higher than an upper end 32U of the frame body 32 of the display unit 30 by a height H or more, such as a height H of, for example, 40 mm or more.

Figure 5:
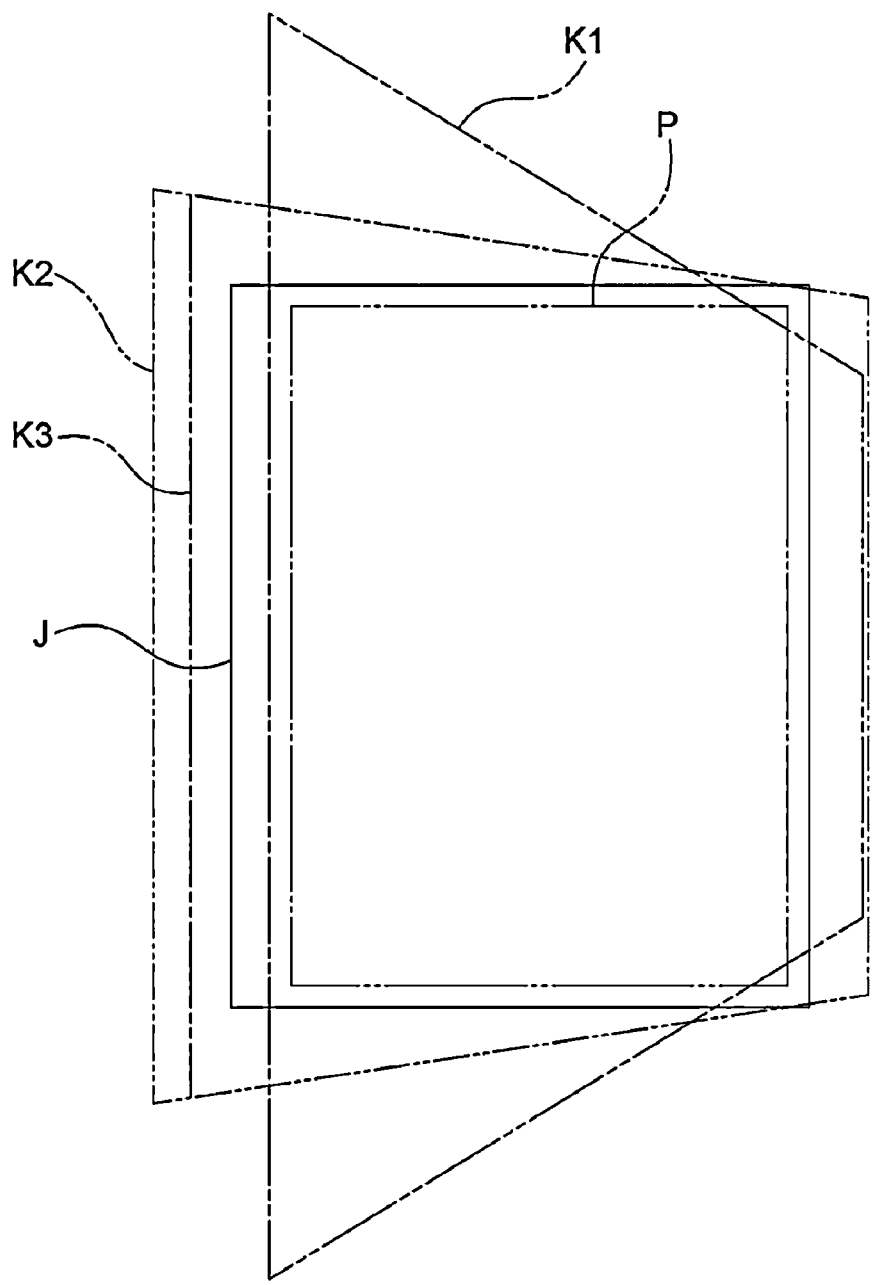
FIG. 5 is a plan view illustrating an image capturing range of a document camera of the image reading device according to this exemplary embodiment.

In this exemplary embodiment, the image capturing range E1 of the document camera 40 is a range indicated with an imaginary line K2 in FIG. 5, and the actual image capturing range E1 on the placement section 24 is a range indicated with a solid line J in FIG. 5. Although the image capturing range E1 and the irradiation range E2 appear to be substantially identical to each other in FIGS. 4 and 6, strictly speaking, the two ranges are different from each other.

More specifically, the area of the irradiation range E2 on the placement section 24 is smaller than the area of the image capturing range E1, and the irradiation range E2 has a rear position and left and right positions that are substantially identical to those of the image capturing range E1 but has a front position that does not extend toward the front side as much as the front position of the image capturing range E1. In other words, as indicated with an imaginary line K3 in FIG. 5, the front side of the irradiation range E2 is disposed forward of the solid line J and rearward of the imaginary line K2.

Furthermore, on the placement section 24, the image capturing range E1 indicated with the solid line J is larger than a document placement range (indicated with an imaginary line P in FIG. 5). The document placement range, that is, the range indicated with the imaginary line P, is set by aligning the corners of the document with corner marks (not shown) provided on the placement section 24. In other words, the corner marks provided on the placement section 24 serve as the reference for the document placement range.

The following description relates to the operation in the image reading device 20 according to this exemplary embodiment having the above-described configuration.

There are two methods for reading an image of a document by using the image reading device 20 according to this exemplary embodiment. One method involves setting the document on the document placement section 26 and reading the image from the document while transporting the document. The other method involves placing the document on the placement section 24 and reading the image from the document by photographing the document from above by using the document camera 40.

When the image recorded on the document is to be read by photographing the document using the document camera 40, the display unit 30 is preliminarily disposed at a position located outside the image capturing range E1 of the document camera 40 and the irradiation range E2 of the LED lamp 42, as mentioned above. Therefore, even if the display unit 30 exists between the placement section 24 on which the document is placed and the document camera 40 and the LED lamp 42 in front view and side view, the captured image of the document is still readable.

Furthermore, as mentioned above, in front view, the display unit 30, the document camera 40, and the LED lamp 42 are arranged in the up-down direction. Specifically, the center of the display unit 30, the center of the document camera 40, and the center of the LED lamp 42 are arranged on the imaginary center line C extending in the up-down direction. Thus, the length of the image reading device 20, including the display unit 30, in the width direction may be reduced, as compared with a case where the center of the display unit 30, the center of the document camera 40, and the center of the LED lamp 42 are not aligned with one another in the width direction.

As mentioned above, the display unit 30 is located at a rear position opposite the standing position of the operator. Thus, a large area may be ensured for the placement section 24 on which the document is placed, as compared with a case where the display unit 30 is located at the front side where the operator stands. When photographing is to be performed using the document camera 40, the operable section 34 of the display unit 30 is set to the dark mode. Thus, power consumption may be reduced, as compared with a case where the operable section 34 of the display unit 30 is kept in a lit mode when photographing is to be performed using the document camera 40.

The irradiation range E2 of the LED lamp 42 is smaller than the image capturing range E1 of the document camera 40. Thus, a decrease in the illuminance of the LED lamp 42 may be suppressed, as compared with a case where the irradiation range E2 of the LED lamp 42 is larger than the image capturing range E1 of the document camera 40. As viewed from the standing position of the operator, the irradiation range E2 of the LED lamp 42 does not extend toward the front side more than the image capturing range E1 of the document camera 40. Thus, a decrease in the illuminance may be suppressed, as compared with a case where the irradiation range E2 of the LED lamp 42 extends toward the front side more than the image capturing range E1 of the document camera 40.

The rear end of the top surface 22U of the device body 22 is provided with the cutout 28 through which the pillar 36 extends. Thus, the length of the apparatus body 12 in the front-rear direction may be reduced, as compared with a case where, for example, the apparatus body 12 extends rearward further than the device body 22 to allow the pillar 36 to extend upward from the apparatus body 12.

Furthermore, the support pillar 38 extends upward independently of the pillar 36. In other words, there is no connection member provided between the support pillar 38 and the pillar 36. Thus, even when the operable section 34 of the display unit 30 is operated and an external force is applied to the pillar 36 via the display unit 30, there are no adverse effects on the document camera 40 and the LED lamp 42 via the support pillar 38.

The display unit 30 existing between the placement section 24 on which the document is placed and the document camera 40 and the LED lamp 42 may be configured such that the angle θ1 relative to the vertical direction is changeable. In that case, it is desirable that the LED lamp 42, including the bent section 38A, and the document camera 40 be automatically set to an angle θ2 positionally corresponding to the angle θ1 of the display unit 30.

Specifically, it is desirable that the angle θ2 of the bent section 38A relative to the angle θ1 of the display unit 30 be preliminarily prepared such that the display unit 30 is disposed at a position located outside the image capturing range E1 of the document camera 40 and the irradiation range E2 of the LED lamp 42. With such a configuration, the image of the document captured by the document camera 40 is readable even when the angle θ1 of the display unit 30 is changed.

Figure 6:
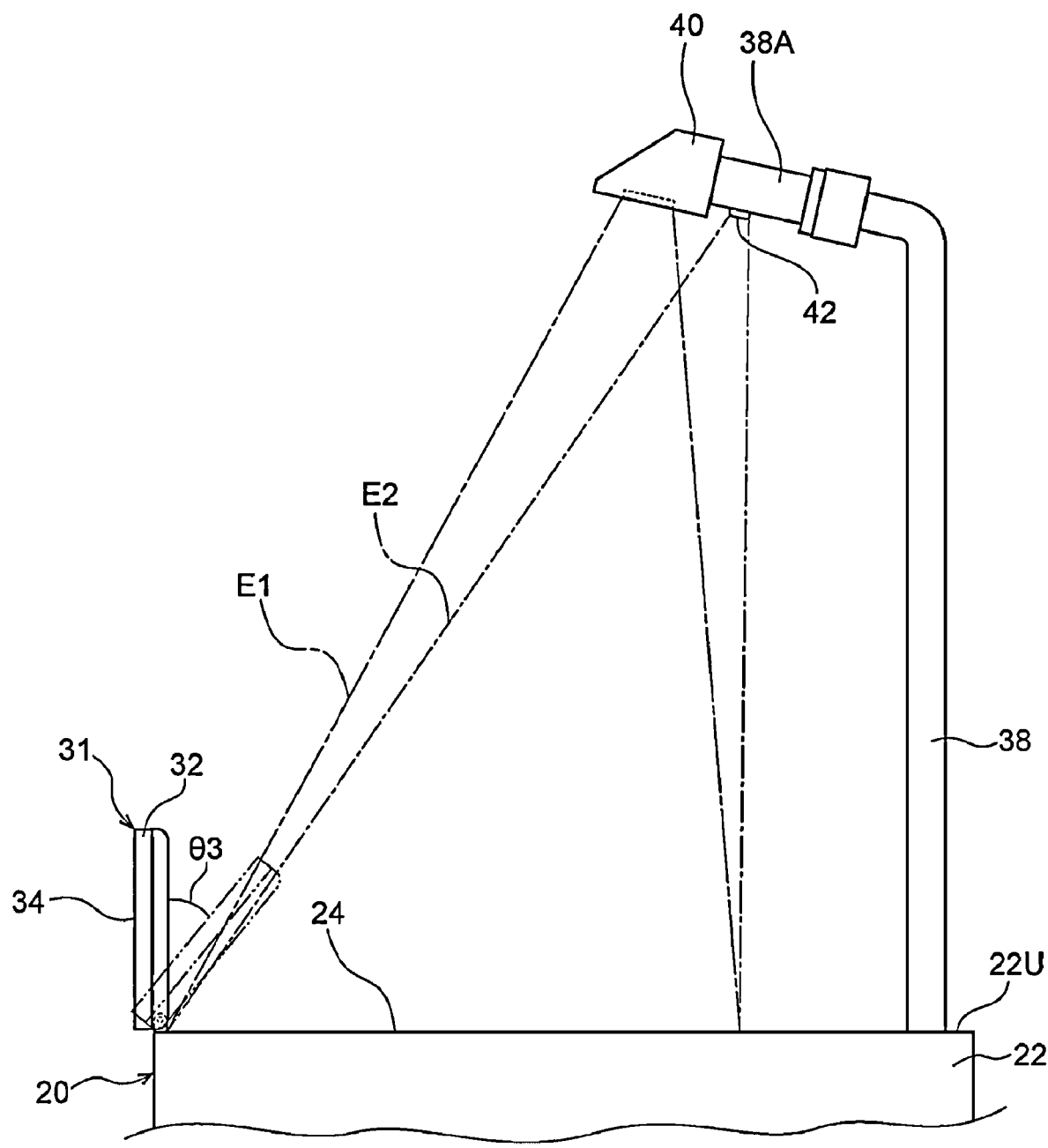
FIG. 6 is a side view illustrating a modification of the image reading device according to this exemplary embodiment.

Furthermore, referring to FIG. 6, as an alternative to the display unit 30 shown in FIGS. 1 to 4, for example, a small-size display unit 31 in which the operable section 34 is about 7 inches may be provided at the front side of the device body 22. In this case, the display unit 31 has its lower end supported in a rotatable manner by a rotation shaft (not shown) whose axial direction extends in the left-right direction, such that an angle θ3 relative to the vertical direction is changeable.

Specifically, when the operator is to operate the operable section 34, the display unit 31 is tilted rearward (as indicated with an imaginary line in FIG. 6) to the angle θ3 relative to the vertical direction to facilitate the operation. Then, when the image of the document placed on the placement section 24 is to be captured, the display unit 31 is set in a vertically erected state so as to be positioned outside the image capturing range E1 (as indicated with a solid line in FIG. 6).

In other words, in the case of the image reading device 20 having such a configuration, when the display unit 31 is set in the vertically erected state, the display unit 31 is automatically positioned outside the image capturing range E1. The process for changing the orientation of the display unit 31 about the rotation shaft may be performed manually or may be performed automatically in response to an operation performed on the operable section 34.

Although the image reading device 20 according to this exemplary embodiment has been described above with reference to the drawings, the image reading device 20 according to this exemplary embodiment is not limited to that shown in the drawings, and design modifications are permissible, where appropriate, so long as they do not depart from the scope of the exemplary embodiment of the disclosure. For example, the image reading device 20 according to this exemplary embodiment does not have to be provided with the transport and reading units that read a document while transporting the document.

Furthermore, the LED lamp 42 is not limited to a single lamp and may include multiple lamps. In this case, the multiple LED lamps 42 do not necessarily have to be arranged on the imaginary center line C. Specifically, for example, in a case where the LED lamp 42 includes two lamps arranged in the left-right direction, the pair of left and right LED lamps 42 may be arranged at opposite sides of the imaginary center line C and be separated therefrom by the same distance.

Furthermore, in the image reading device 20 according to this exemplary embodiment, the center of the display unit 30, the center of the document camera 40, and the center of the LED lamp 42 may be slightly misaligned with one another in the left-right direction so long as the display unit 30, the document camera 40, and the LED lamp 42 are arranged in the up-down direction above the placement section 24. For example, the display unit 30 may be deviated in the left-right direction from the imaginary center line C extending through the center of the document camera 40 so long as the deviation is about ±5% of the length of the display unit 30 in the left-right direction.

In other words, the term "slightly" refers to about ±5% of the length of the display unit 30 in the left-right direction. However, it is desirable that the center of the display unit 30, the center of the document camera 40, and the center of the LED lamp 42 be arranged on the imaginary center line C. Furthermore, when photographing is to be performed using the document camera 40, the operable section 34 of the display unit 30 may be set to a dimmed mode that is extremely close to the dark mode, instead of being set to the dark mode. In this exemplary embodiment, such a dimmed mode is included in the dark mode.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
a placement section on which a subject is placed;
a camera that is disposed above the placement section and captures an image of the subject;
a light source that is disposed above the placement section and irradiates the subject with light; and
a display that is disposed between the placement section and the camera and between the placement section and the light source, the display being located at a position outside an image capturing range of the camera and an irradiation range of the light source.

2. The image reading device according to claim 1, wherein the camera and the display are arranged in an up-down direction, as viewed from a standing position of an operator.

3. The image reading device according to claim 2, wherein a center of the camera and a center of the display are arranged on a straight line extending in the up-down direction.

4. The image reading device according to claim 3, wherein the display is disposed at a rear position opposite the standing position of the operator.

5. The image reading device according to claim 4, wherein the display is set to a dark mode when the image of the subject is to be captured by the camera.

6. The image reading device according to claim 3, wherein the irradiation range of the light source is smaller than the image capturing range of the camera.

7. The image reading device according to claim 2, wherein the display is disposed at a rear position opposite the standing position of the operator.

8. The image reading device according to claim 7, wherein the display is set to a dark mode when the image of the subject is to be captured by the camera.

9. The image reading device according to claim 2, wherein the irradiation range of the light source is smaller than the image capturing range of the camera.

10. The image reading device according to claim 1, wherein the camera, the light source, and the display are arranged in an up-down direction, as viewed from a standing position of an operator.

11. The image reading device according to claim 10, wherein a center of the camera, a center of the light source, and a center of the display are arranged on a straight line extending in the up-down direction.

12. The image reading device according to claim 11, wherein the display is disposed at a rear position opposite the standing position of the operator.

13. The image reading device according to claim 12, wherein the display is set to a dark mode when the image of the subject is to be captured by the camera.

14. The image reading device according to claim 10, wherein the display is disposed at a rear position opposite the standing position of the operator.

15. The image reading device according to claim 14, wherein the display is set to a dark mode when the image of the subject is to be captured by the camera.

16. The image reading device according to claim 1, wherein the display is disposed at a rear position opposite a standing position of an operator.

17. The image reading device according to claim 16, wherein the display is set to a dark mode when the image of the subject is to be captured by the camera.

18. The image reading device according to claim 1, wherein the irradiation range of the light source is smaller than the image capturing range of the camera.

19. The image reading device according to claim 18, wherein the irradiation range does not extend to a front side, as viewed from a standing position of an operator.

20. The image reading device according to claim 1, wherein a screen surface of the display forms a first predetermined angle with respect to a vertical direction, wherein the camera and the light source are disposed on a bent section, and wherein the bent section forms a second predetermined angle with respect to a horizontal direction, and wherein the first predetermined angle changes with respect to the second predetermined angle.

* * * * *